United States Patent [19]

Marino et al.

[11] Patent Number: 4,850,007

[45] Date of Patent: Jul. 18, 1989

[54] TELEPHONE TOLL SERVICE WITH ADVERTISING

[75] Inventors: Patrick J. Marino, Middletown; Arun N. Netravali, Westfield, both of N.J.

[73] Assignees: American Telephone and Telegraph Company, New York, N.Y.; AT&T Bell Laboratories, Murray Hill, N.J.

[21] Appl. No.: 66,917

[22] Filed: Jun. 25, 1987

[51] Int. Cl.⁴ .................. H04M 1/64; H04M 3/42; H04M 11/00

[52] U.S. Cl. .................. 379/67; 379/112; 379/84

[58] Field of Search .................. 379/67, 70, 84, 87, 379/112, 114, 121, 257

[56] References Cited

U.S. PATENT DOCUMENTS

| | | |
|---|---|---|
| 3,111,561 | 11/1963 | Dunning .................. 379/82 |
| 3,876,840 | 4/1975 | Bryant, Jr. . |
| 4,165,446 | 8/1979 | Flowers et al. . |
| 4,510,349 | 4/1985 | Segre-Amar . |

FOREIGN PATENT DOCUMENTS

| | | |
|---|---|---|
| 57-87661 | 6/1982 | Japan .................. 379/201 |
| 58-173951 | 10/1983 | Japan . |

OTHER PUBLICATIONS

L. Strauss, *Electronic Marketing*, Knowledge Industry Publication Inc., (1983) p. 52.

Primary Examiner—Alan Faber
Assistant Examiner—James E. Tomassini
Attorney, Agent, or Firm—Wilford L. Wisner

[57] ABSTRACT

There is disclosed a system for providing an economical telephone toll service in which a telephone subscriber selects the economical service by, for example, sending an appropriate signal, and then dials his directory assistance call or other telephone toll call. After the caller's options are determined and typically before signaling for the call is commenced, a recorded-announcement of an aural or visual nature is connected to the subscriber's line, the announcement consisting of at least one advertisement. The advertisements are selected from a databank according to some predetermined technique of selection, which may include any number of factors or features to make the service attractive to subscribers and of a nature to make the service also sufficiently rewarding to advertisers. After the initial delay, usually after the advertising announcement is completed, the toll call and/or directory assistance call is processed as usual but at a reduced rate of charge or with automatic credit being given to the customer's account.

4 Claims, 2 Drawing Sheets

4,850,007

TELEPHONE TOLL SERVICE WITH ADVERTISING

TECHNICAL FIELD

This invention relates to systems for providing telephone toll services such as, but not limited to, directory assistance or long-distance calling.

PROBLEM

Since directory assistance charges were first instituted by telephone operating companies, some telephone customers have thought such charges to be excessive. Many of these same people also feel that charges for long-distance calling, although they have decreased at a surprising rate, are still too high.

In an era of decreasing regulation and increasing competitiveness of telephone service, telephone operating companies, both long-distance companies and local exchange companies, can ill afford to ignore such customer sentiments if they are sufficiently broadly based.

On the other hand, it is essential to recover sufficient revenues to cover the cost of directory assistance calling, other information services and long-distance service.

There are also areas in any telephone network where the availability of telephone toll services of various types exceeds the demands for such services. It is economically desirable for any telephone operating company to encourage expanded use of excess available services, including toll services of all types. In extreme cases the ability to encourage expanded use of such service may make the difference between economic viability and nonviability of the telephone service provider.

SOLUTION AND SUMMARY OF THE INVENTION

The above-described problems are solved according to the invention by providing an economical telephone toll service in which a telephone subscriber selects the economical service by, for example, sending an appropriate signal, and then dials his directory assistance call or other telephone toll call. After the caller's options are determined and typically before signaling for the call is commenced, a recorded-announcement of an aural or visual nature, or both, is connected to the subscriber's line, the announcement consisting of at least one advertisement. The advertisements are selected from a databank according to some predetermined technique of selection, which may include any number of factors or features to make the service attractive to subscribers and of a nature to make the service also sufficiently rewarding to advertisers. After the advertising announcement is completed, the toll call and/or directory assistance call is processed as usual but at a reduced rate of charge or with automatic credit being given to the customer's account.

This type of service flexibly lends itself to a number of subordinate features. There are various ways for the caller to invoke the service--for instance he can subscribe to it by a periodic or occasional choice. Alternatively, any subscriber could invoke this service by dialing a special access code, for instance, which would connect into a 700 type service.

The system also lends itself to arranging the service so that the needs of advertisers are appropriately taken into account so that their advertisement gets heard at least a certain minimum number of times in an appropriate time period, or so that it is heard by an appropriate demographic group of callers.

This new telephone toll service differs from telephone shopping services in that the caller is not looking for the specific information contained in the advertisement--indeed, he is looking for other information or seeking to place a personal long-distance call. Nevertheless, he can in general be very interested in the subject matter of the advertisement if the advertisement selection technique is adapted to pick advertisements suited to his generally interest.

The announcement period can be interactive so that the advertiser can be assured that the calling party actually listens to his ad, and they can be of various lengths so that, for the particular demographic set or category of persons involved, the hearer is unlikely to become bored during the announcement period. One way of verifying that the caller is actually listening is for him to be asked to send either an alpha-numeric signal or a voice signal in response to intermittent queries interposed in the message. Particularly at the end of each advertisement, one might expect that the customer could be asked to press, for example, the number 9 on his telephone keypad. Also, content in the ad may be arranged hierarchically so that customer can press a button to hear more details of the ad for which more credit can be given.

Advantageously, the income from advertisers in respect to this service does not need to be fully equal to the reduction in income from the using telephone subscribers because of the characteristics of the service which encourages using spare capacity in off-peak periods of the telephone system or habituates customers to making toll calls more frequently. Moreover, billing may be a rate reduction per call or a monthly credit towards some toll service. It is also possible that coupons good for the purchase of merchandise or services could be the form, in whole or in part, in which the caller receives value for his cooperation.

DETAILED DESCRIPTION

Figure 1:
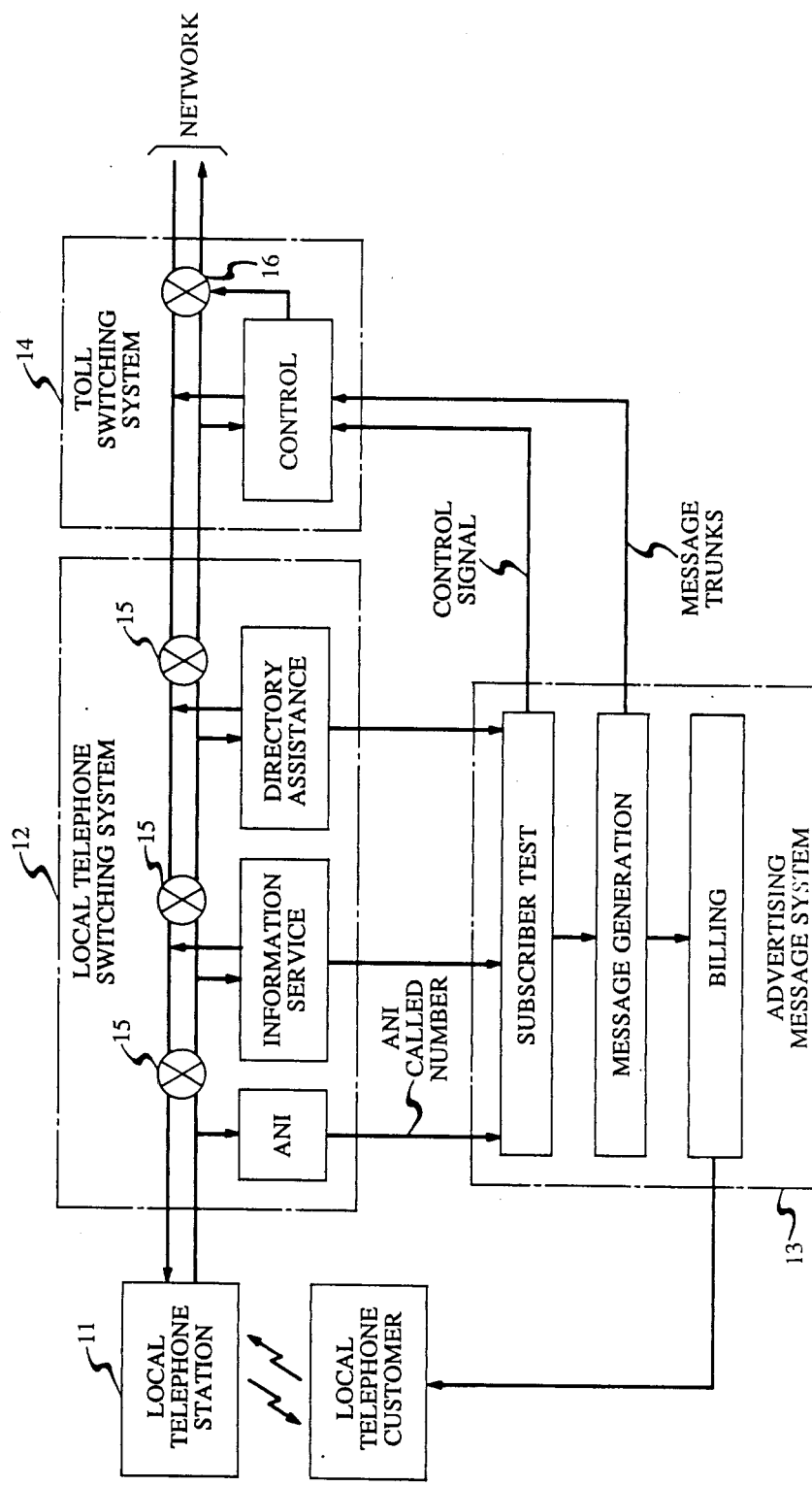
FIG. 1 is a block diagram of a telephone toll system embodying the present invention.

In FIG. 1, the local telephone station 11 is the typical telephone handset, in the usual case, and is connected by the typical local loop wires and connections to a local telephone switching system 12 which in turn connects through a toll switching system 14 to the total telephone network. Interconnected with the local telephone switching system 12 and the toll switching system 14 is the advertising message system 13 which is adapted to provide the announcement feature and associated billing that has been generally summarized above.

In general, the local telephone station 11 is used by a local telephone customer, indicated schematically, to whom the billing will be returned which shows his reduced telephone toll charge rate or, alternatively, the lump sum credits he is receiving for listening to, or watching, advertising messages from advertising message system 13.

The internal connections of the system are, in more detail, the following. The line from local telephone station 11 will be routed, through portions of switching elements 15, to the directory assistant module of the local switching system 12 if that is the nature of the customer's request, and in general, this may have been reached by dialing 411 or by dialing 555-1212 after the appropriate area code. Alternatively, the switching system 12 may also detect, depending on the prefixes which the customers dial, that the customer is seeking certain information services, such as time or weather. Request for either of these services may be an occassion to offer a subscriber a reduced rate or a credit in return for listening to, or watching, advertising messages from advertising message system 13.

It is anticipated that the broadest volume of use will result from longdistance calling. The routing automatic number identification (ANI) within local telephone switching system 12, together with the subscriber test equipment in advertising message system 13, will identify the local customer in question as being one who wants to receive reduced long-distance calling rates so that his incoming line will automatically be connected to advertising message system 13 before his toll call is completed. In the simplest form of the service, it is not necessary to do an ANI look-up if, for example, the customer initiated his current call by dialing appropriate additional (initial or final) digits to indicate he wants to receive the discount. Alternatively, in either version, if different people are using the same line (as in a family phone) a two-digit prefix could be used—first digit to activate service; second digit to specify the person.

In all of the foregoing situations identified in local telephone switching system 12, the result will be that a signal is sent to advertising message system 13 which results in a control signal being sent to toll switching system 12 to switching elements 16 to prevent the further progress of the subscriber's call until the new features of this toll service have been provided. Therefore, at this point, the local telephone subscriber is not in contact with the larger telephone network.

For billing purposes, all of the local subscriber's calls, when they involve possible toll charges, are subjected to ANI as indicated in the right-hand block of local telephone switching system 12. This is done quickly and with little trouble in current telephone systems, and can be done initially, or later, as indicated above. In either case, it is possible to subject the call to the subscriber test indicated in advertising message system 13 in order to determine whether the particular calling party is one who desires the reduced rate toll service. For those subscribers who have no interest in such a service and who don't want to experience delay in accessing the network through toll switching system 14, the subscriber test can immediately determine that this person's call should not be delayed or interfered with but should be connected directly to toll switching system 14. All such tests can be performed sufficiently rapidly so that the calling party will be unaware of the operations that have just been described.

On the other hand, if the subscriber test in advertising message system 13 determines that the calling party is one who wishes a reduced rate of calling or credit in return for auditing or otherwise receiving advertising, then an appropriate message is generated by the appropriate equipment in system 13 and routed via one of the message trunks through switching systems 14 and 12 to local telephone station 11.

In point of fact, this message may be of either an aural or visual nature, especially if the local subscriber has made available a monitor or television set connected to his telephone line. When this message ends, the control network within toll switching system 14 then removes the block on the signaling for the toll call and the call goes out over the network in the usual fashion. It should be apparent that in order to block the dialed call as described, the control elements of the toll switching system 14 require sufficient storage capability to store the calling information. It should be noted that the caller has another option; the ad may be played during the conversation with both caller and called party listening. In this case, the blocking of the call would continue only until this option of the caller was determined.

Also at the conclusion of the message, the appropriate billing item is generated by the billing portion of the advertising message system 13, and this reduced rate billing and/or credit is accumulated and is sent with the customer's monthly bill to his home.

Among the various bases for determining what advertising message will be connected to which calling party's line, foremost are various types of demographic information that are available to the system. For example, a certain amount of demographic focus is provided via the central office code contained in the ANI. A particular message could be directed to, for example, directory assistance requests from a given number plan area where it is determined that persons living in that area are likely to be interested in certain kind of subject matter. Similar information can be derived from the access code dialed or central office code dialed of the called party which shows that the caller has an interest in another number plan area or in another state or region of the country. This sort of screening also makes it possible to eliminate certain kinds of ads for certain classes of callers, for example, for businesses. Indeed, in the latter case, even if the appropriate choice were to be made for obtaining of the reduced rate telephone toll service with advertising, it may be desirable to render businesses ineligible for this kind of service. The ANI makes it possible to provide this degree of limitation of the service.

Certain other bases for determining the message to be provided can be explained from the following example. Let's assume that a prefix (symbol such as * or # already on the telephone keypad) is designated as the access code for activating this new economical toll service. A toll call would then be placed by dialing, for example, * +(area code)+(seven digit number). The local central office, recognizing that the caller is interested in the subject service, will play a recorded message as follows:

"Choose one, two or three minutes of advertisement by pressing keys 1, 2 or 3 on your telephone pad".

Once the caller presses the key, a recorded voice announcement and/or television display will be sent to the calling party. A set of advertisements is chosen to occupy the chosen announcement time period since most individual advertisements will be much shorter than a minutes.

These announcements could also have been chosen on a random basis, or they could have been chosen to provide sufficient exposure to each of the advertisers who provided the ads for this service. In any event these advertisements will be stored in a large-scale mass memory.

In order that the advertisements may be more focussed to the interests of the caller and therefore more likely to be productive for the advertiser, a caller generally interested in this service may let the telephone company know by, for example, an appropriate check-off on his monthly bill, which of several different categories of subjects he is interested in; or a separate profile card could be filled out by the caller from time-to-time giving the telephone company more detailed background and interest information which would be of assistance.

Since an interest profile is specific to a person and not a telephone number, after the initial preliminary announcement sent out as described above, the message could ask the caller to identify himself with regard to which of many individuals associated with this specific calling number he happens to be. This information then will affect which set of recorded advertisements he hears.

Further, within the interest profile of the caller, a round-robin type of sequencing of appropriate advertisements will help to insure that no appropriate advertisements get neglected.

Another possible implementation is as follows: imaging several tapes being continuously played at the information service block (15). Each tape contains information about a particular interest. Each customer requesting such a service will be connected to this tape for a certain amount of time; they will hear more or less randomly an ad from the tape. Actual implementation may not use a tape, but this will be cheaper.

In all of the foregoing versions of the service, it should be apparent that the interactive logic could be extended to make it possible for the customer to indicate, e.g., by dialing appropriate digits, that he wishes written material to be sent to him or that he wishes to talk to a salesman—now or later.

It should be clear that from the mass of data involved in the profile cards and the ANI and billing information generated as time passes that there will be much statistical information that can be made available to advertisers and which will increase the value of the service to them. Nevertheless, effort should be made to ensure privacy of specific individuals.

Figure 2:
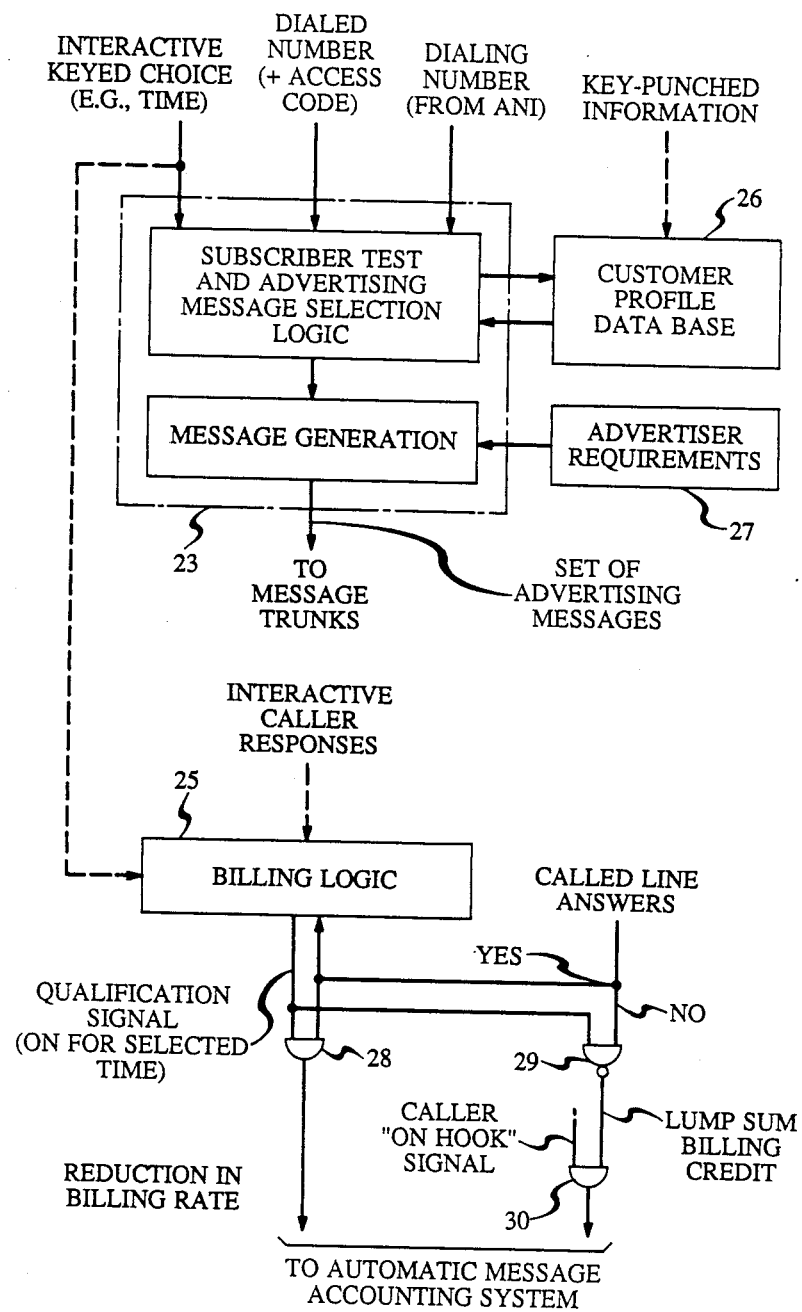
FIG. 2 shows a block diagram of parts of the system involved with selecting the type of announcement connected to a particular subscriber's line.

We have attempted to lay out in FIG. 2 a chart illustrating most of the foregoing message choice criteria in a logical manner.

It should be apparent that many modifications of this service and of these bases for choices can be made within the spirit and scope of our invention.

What is claimed is:

1. A telephone toll system of the type in which a local telephone station is connected to the telephone network through at least one telephone switching system including means (ANI) for automatically establishing identification of the calling number and means for automatically determining charges for at least one toll service, comprising means (13) including subscriber test equipment for determining whether the calling number should receive a reduced rate or credit with respect to receiving recorded advertising and including billing equipment for generating the corresponding billing or credit, and means responsive to a positive signal from the subscriber test equipment of the determining means indicating that the calling party should receive said reduced rate or credit for delaying access to the toll service for a predetermined period and means for delivering the recorded advertising to the local telephone station (11);

said system being characterized in that the subscriber test equipment includes means for generating in addition to the positive signal a signal selecting the type of recorded advertising to be received responsive to a preference specific to the calling number.

2. A telephone toll system of the type claimed in claim 1 further caracterized in that the selecting signal generating means is interactive with the local telephone station.

3. A telephone toll system of the type claimed in claim 2 further characterized in that the telephone toll service is directory assistance calling.

4. A telephone toll system of the type claimed in claim 2 characterized in that the telephone toll service is long-distance calling.

* * * * *

UNITED STATES PATENT AND TRADEMARK OFFICE
CERTIFICATE OF CORRECTION

PATENT NO. : 4,850,007

DATED : July 18, 1989

INVENTOR(S) : Patrick J. Marino et al

It is certified that error appears in the above-identified patent and that said Letters Patent is hereby corrected as shown below:

Column 6, line 25, claim 1, after the word "means" insert --(message trunks)--

Signed and Sealed this

Third Day of July, 1990

Attest:

HARRY F. MANBECK, JR.

*Attesting Officer*  *Commissioner of Patents and Trademarks*